US011907166B2

(12) United States Patent
Lee et al.

(10) Patent No.: US 11,907,166 B2
(45) Date of Patent: Feb. 20, 2024

(54) ELECTRONIC DEVICE AND METHOD FOR UPDATING DATABASE BASED ON RESERVED SPACE

(71) Applicant: Samsung Electronics Co., Ltd., Suwon-si (KR)

(72) Inventors: Kisung Lee, Suwon-si (KR); Hyeeun Jun, Suwon-si (KR); Kiwon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/555,826

(22) Filed: Dec. 20, 2021

(65) Prior Publication Data

US 2022/0222216 A1  Jul. 14, 2022

Related U.S. Application Data

(63) Continuation of application No. PCT/KR2021/018479, filed on Dec. 7, 2021.

(30) Foreign Application Priority Data

Jan. 13, 2021 (KR) ........................ 10-2021-0004883

(51) Int. Cl.
*G06F 16/17* (2019.01)
*G06F 16/18* (2019.01)

(52) U.S. Cl.
CPC ...... *G06F 16/1727* (2019.01); *G06F 16/1805* (2019.01)

(58) Field of Classification Search
CPC ............. G06F 16/1805; G06F 16/1727; G06F 16/1806

USPC ........................................................ 707/825
See application file for complete search history.

(56) References Cited

U.S. PATENT DOCUMENTS

| 11,042,453 B2 | 6/2021 | Won et al. |
| 2013/0185337 A1* | 7/2013 | Lipcon .................. G06F 3/0631 707/813 |
| 2017/0293536 A1* | 10/2017 | Won .................... G06F 16/2358 |
| 2020/0218710 A1* | 7/2020 | Lee ..................... G06F 16/1865 |

(Continued)

FOREIGN PATENT DOCUMENTS

| EP | 3089051 | 11/2016 |
| KR | 10-2014-0094706 | 7/2014 |
| KR | 10-1765517 | 8/2017 |

(Continued)

OTHER PUBLICATIONS

Search Report and Written Opinion dated Mar. 8, 2022 in counterpart International Patent Application No. PCT/KR2021/018479.

*Primary Examiner* — Hosain T Alam
*Assistant Examiner* — Tracy M McGhee
(74) *Attorney, Agent, or Firm* — Nixon & Vanderhye P.C.

(57) ABSTRACT

Various embodiments of the disclosure disclose a method and an apparatus, which includes: a display, a memory, and a processor operatively connected to the display and/or the memory, wherein the processor is configured to: add a frame to an appended file based on a request to update application data, allocate a reserved space to the appended file, update a database file based on an update condition, and allocate the reserved space to the database file.

9 Claims, 11 Drawing Sheets

(56) References Cited

U.S. PATENT DOCUMENTS

2020/0265010 A1    8/2020  Lee et al.

FOREIGN PATENT DOCUMENTS

| KR | 10-2019-0021773 | 3/2019 |
| KR | 10-2020-0060220 | 5/2020 |
| KR | 10-2020-0101217 | 8/2020 |
| WO | 2019/039706 | 2/2019 |

* cited by examiner

ELECTRONIC DEVICE AND METHOD FOR UPDATING DATABASE BASED ON RESERVED SPACE

CROSS-REFERENCE TO RELATED APPLICATIONS

This application is a continuation of International Application No. PCT/KR2021/018479 designating the United States, filed on Dec. 7, 2021, in the Korean Intellectual Property Receiving Office and claiming priority to Korean Patent Application No. 10-2021-0004883, filed on Jan. 13, 2021, in the Korean Intellectual Property Office, the disclosures of which are incorporated by reference herein in their entireties.

BACKGROUND

Field

The disclosure relates to a method and an apparatus for updating a database of application data based on a reserved space.

Description of Related Art

With the development of digital technology, various types of electronic devices, such as a mobile communication terminal, a personal digital assistant (PDA), an electronic notebook, a smart phone, a tablet personal computer (PC), and a wearable device, have been widely used. For function support and increase of such electronic devices, hardware parts and/or software parts of the electronic devices have been continuously improved.

For a normal operation of an application, an electronic device is required to secure atomicity of a transaction for application data stored in a database and data integrity for always maintaining normal data in the database. The transaction may include an update operation, such as correction, deletion, or addition of the application (or application data). The atomicity may refer, for example, to the results of all arithmetic operations related to one transaction all being applied in the database, or not applied at all in the database. In order to secure the data integrity and the atomicity of the transaction, the database may use a journal technique. The journal technique may be a technique to generate and utilize a write ahead log (WAL) file or a rollback journal file in addition to a database file for storing the application data.

In case that an update operation is performed with respect to an application several times, several frames corresponding to the update operation may be added to the WAL file. If a plurality of frames are added to the WLA file, the size of the WAL file may become larger. A new storage space is allocated to the WAL file whenever the frames are added, and if the memory space of the electronic device is insufficient, an error may occur during an operation of updating the database file with the frames stored in the WAL file.

SUMMARY

Embodiments of the disclosure provide a method and an apparatus for preventing and/or reducing an update failure of the database file due to a lack of storage space during updating of the database (e.g., correction, deletion, or addition).

An electronic device according to various example embodiments of the disclosure may include: a display; a memory; and a processor operatively connected to the display or the memory, wherein the processor is configured to: add a frame to an appended file based on a request to update application data, allocate a reserved space to the appended file, update a database file based on an update condition, and allocate the reserved space to the database file.

A method for operating an electronic device according to various example embodiments of the disclosure may include: receiving a request to update application data stored in a memory of the electronic device; adding a frame to an appended file based on the update request; allocating a reserved space to the appended file; updating a database file based on an update condition; and allocating the reserved space to the database file.

According to various example embodiments, since the reserved space of the predetermined size is allocated to the database file and the WAL file (or rollback journal file) based on the update of the application data, the update failure of the database file due to the lack of storage space can be prevented or reduced.

According to various example embodiments, since the reserved space is additionally allocated or is not allocated when the frame is added to the WAL file (or rollback journal file) based on the free space of the storage space, the database file can be updated even in the situation of insufficient storage space.

According to various example embodiments, since the update failure of the database file can be prevented or reduced, the operation error or exception of the application due to the database error and the booting issue of the electronic device can be addressed.

According to various example embodiments, since the inconvenience due to the database error or the booting issue of the electronic device can be addressed, the usability can be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
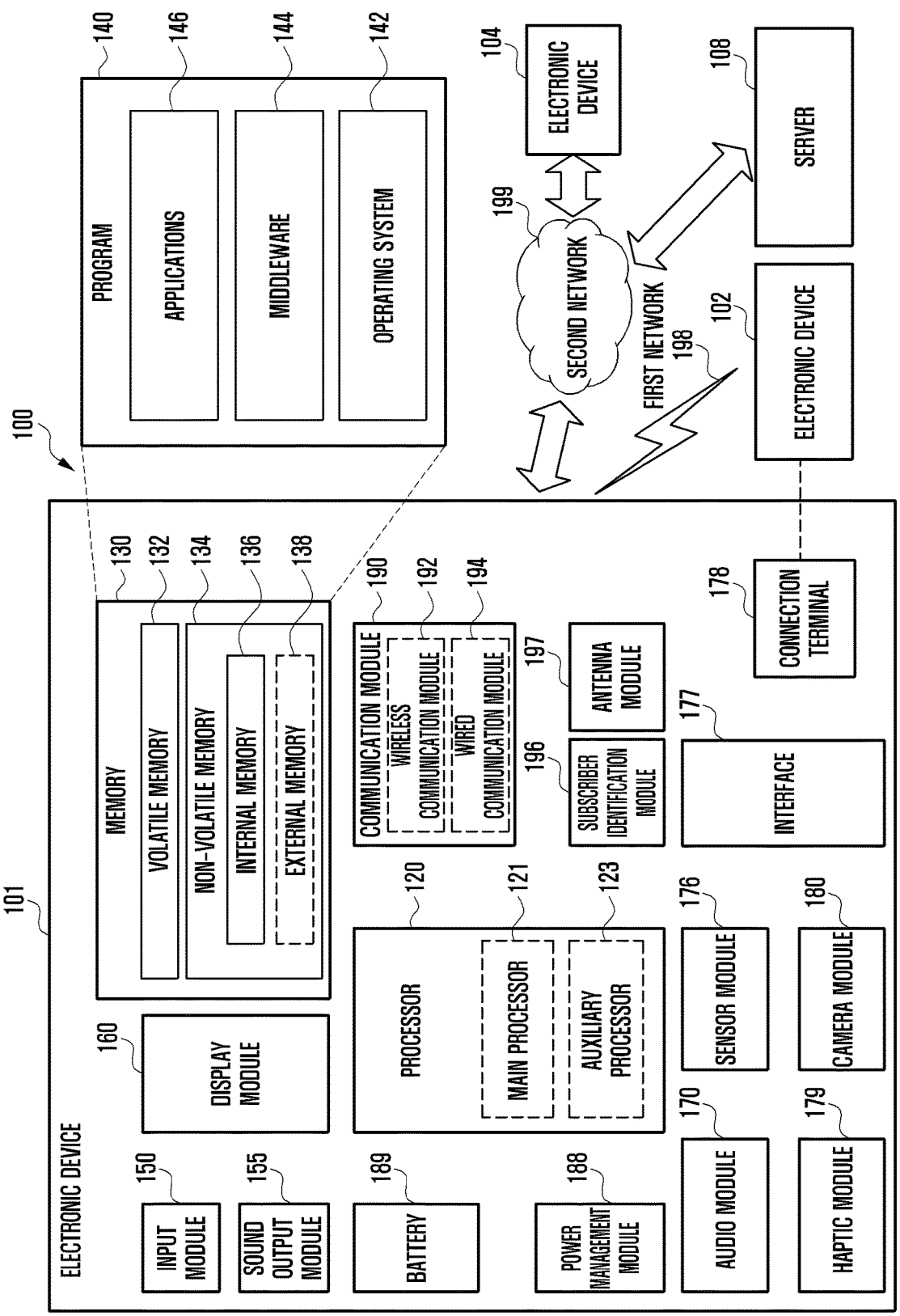
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
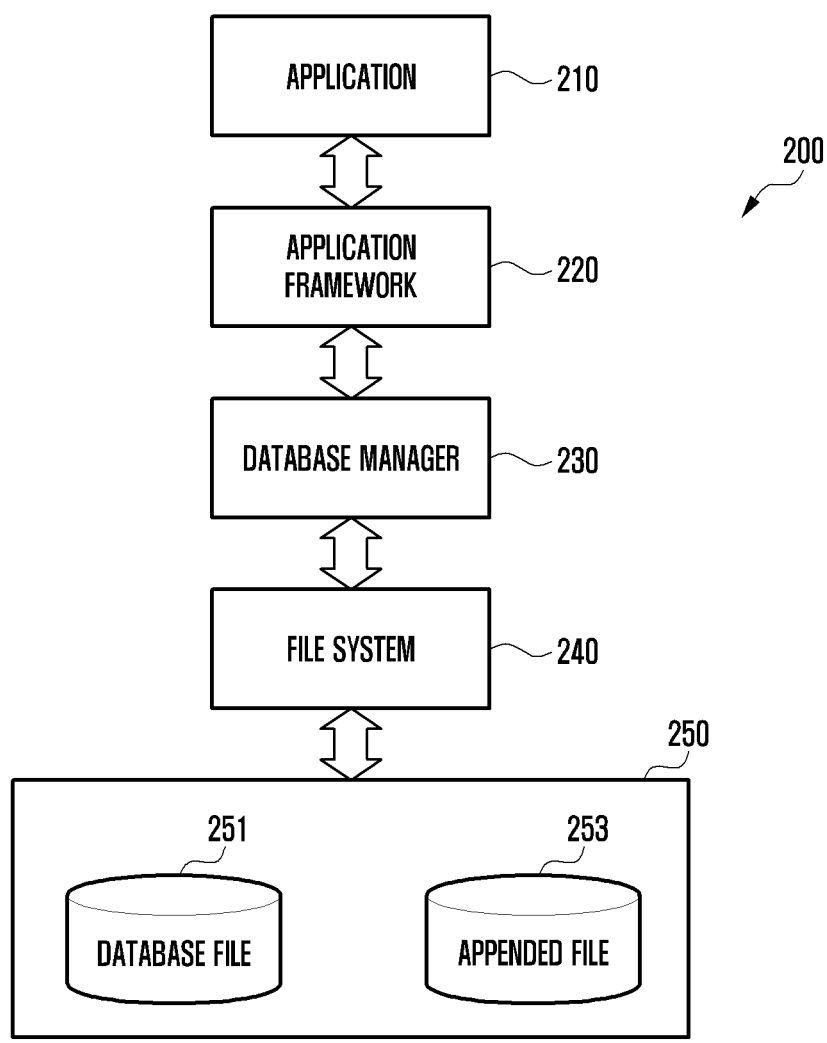
FIG. 2 is a block diagram illustrating an example software configuration of an electronic device according to various embodiments.

FIG. 2 is a block diagram illustrating an example software configuration of an electronic device according to various embodiments.

Referring to FIG. 2, an electronic device (e.g., electronic device 101 of FIG. 1) according to various embodiments may include an operating system (OS) controlling resources related to the electronic device 101 and/or a program module 200 including various applications being driven on the operating system. The operating system may be an operating system, such as, for example, android, iOS, windows, Symbian, tizen, or bada.

The program module 200 may include an application 210, an application framework 220, a database manager 230, and/or a file system 240. At least a part of the program module 200 can be preloaded on the electronic device 101, or can be downloaded from an external electronic device (e.g., electronic device 102 or 104 or server 108).

The application 210 may include various kinds of applications (e.g., phone, text, alarm, and contact) installed in the electronic device 101. The application framework 220 may provide functions commonly required by the application 210, or may provide various functions to the application 210 to efficiently use limited system resources inside the electronic device 101. The database manager 230 may provide various functions to the application 210 so that functions or information provided from one or more resources of the electronic device 101 can be used by the application 210. The file system 240 may refer, for example, to a system that manages files stored in an auxiliary storage device or a disk 250 (e.g., memory 130 of FIG. 1) on the operating system. The disk 250 may include a database file 251 and/or a write ahead log (WAL) file. A journal technique may be applied to the disk 250 in order to secure data integrity and atomicity of a transaction. The journal technique may be a technique to generate and utilize the WAL file in addition to the database file 251 for storing application data.

According to various embodiments, the application data may be stored in the database file 251, and the database file 251 may include a database header, a database schema, database contents, or a data structure. The WAL file may include a write ahead log (WAL) file or a rollback journal file. For example, if an update of the application data occurs, processing results related to the update may be stored in the WAL file before the database file is updated. If the WAL file meets the update conditions, the contents stored in the WAL file may be applied in the database file. For example, if the update of the application data occurs, the original application data may be stored in the rollback journal file before the database file is updated. The rollback journal file may be a backup of the application data. Although the WAL file and the rollback journal file may have different kinds of data stored therein, they may have similar methods for updating the database file.

According to various embodiments, if the update (e.g., correction, deletion, or addition) of the application data occurs, the database manager 230 may add the contents related to the update to the WAL file in the form of a frame, allocate a reserved space of a predetermined size to the WAL file, and allocate a free space of a predetermined size to the database file 251.

An electronic device (e.g., electronic device 101 of FIG. 1) according to various example embodiments may include: a display (e.g., display module 160 of FIG. 1); a memory (e.g., memory 130 of FIG. 1); and a processor (e.g., processor 120 of FIG. 1) operatively connected to the display and/or the memory, wherein the processor is configured to: add a frame to an appended file based on a request to update application data, allocate a reserved space to the appended file, update a database file based on an update condition, and allocate the reserved space to the database file.

According to an example embodiment, the processor may be configured to add changes of the application data stored in the database file to the frame in accordance with the update request.

According to an example embodiment, the processor may be configured to: determine whether the frame is initially added to the appended file, and allocate the reserved space based on whether the frame is initially added.

According to an example embodiment, the processor may be configured to: allocate the reserved space to the appended file based on the frame being initially added to the appended file, and determine whether to allocate the reserved space based on a storage space of the memory based on the frame not being initially added to the appended file.

According to an example embodiment, the processor may be configured to: allocate the reserved space to the appended file based on the storage space of the memory having a size equal to or greater than a predetermined (e.g., specified) size, and not allocate the reserved space to the appended file based on the storage space of the memory being less than the predetermined size.

According to an example embodiment, the processor may be configured to apply the frame stored in the appended file in the database file based on the update condition being satisfied.

According to an example embodiment, the processor may be configured to display a user interface for configuring a size of the reserved space through the display.

According to an example embodiment, the processor may be configured to maintain the reserved space allocated to the appended file and a predetermined (e.g., specified) space based on the database file being updated.

According to an example embodiment, the processor may be configured to control the update condition based on a storage space of the memory based on the database file being updated.

According to an example embodiment, the processor may be configured to: maintain the update condition based on the storage space of the memory having a size equal to or greater than a predetermined (e.g., specified) size, and change the update condition based on the storage space of the memory having a size less than the predetermined size.

Figure 3:
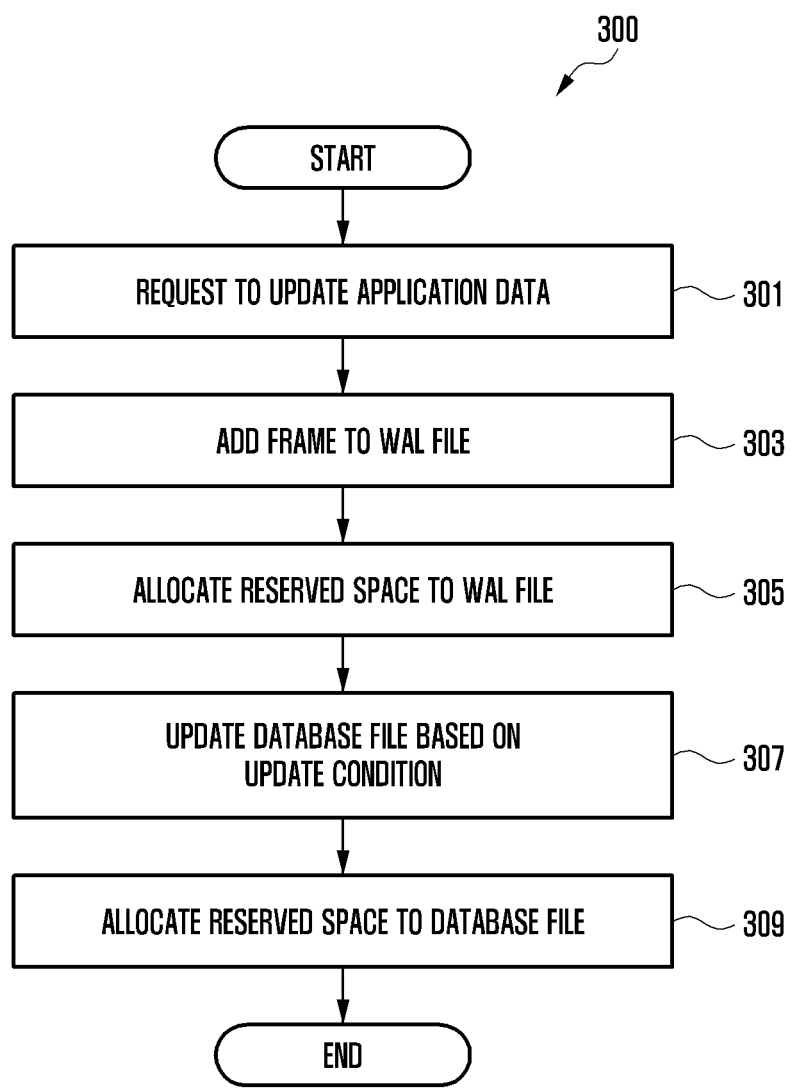
FIG. 3 is a flowchart illustrating an example method for operating an electronic device according to various embodiments.

FIG. 3 is a flowchart 300 illustrating an example method for operating an electronic device according to various embodiments. The method of FIG. 3 may include an operation in case that an appended file is a WAL file.

Referring to FIG. 3, at operation 301, a processor (e.g., processor 120 of FIG. 1) of an electronic device (e.g., electronic device 101 of FIG. 1) according to various embodiments may receive a request to update application data (or application). The update request may refer, for example, to an operation of correcting, deleting, or adding the application data. The update request may be generated by a user, or may occur in accordance with the configuration of the electronic device 101.

At operation 303, the processor 120 may add a frame (or update frame) to a WAL file (or appended file) based on the update request. In order to secure data integrity and atomicity of a transaction, a journal technique may be applied to the memory (e.g., memory 130 of FIG. 1) of the electronic device 101. The journal technique may be a technique to generate and utilize a write ahead log (WAL) file or a rollback journal file as an appended file in addition to the database file for storing the application data. The application data may be stored in the database file (e.g., database file 251 of FIG. 2), and the database file 251 may include a database header, a database schema, database contents, or a data structure. In FIG. 3, a case that the appended file (e.g., appended file 253 of FIG. 2) is the WAL file has been explained as an example, but the disclosure is not limited to such explanation. For example, the WAL file may include a WAL header and at least one WAL frame. The WAL header may include basic information on the WAL file, and for example, the WAL header may include at least one of an identification number, a file format version, a page size, the number of times of update, a frame error check, or a WAL header error check.

According to various embodiments, the identification number may include a magic number for recognizing the WAL file. The file format version may have a fixed value as a format version for the WAL file. The database file 251 may be divided into lumps of a predetermined (e.g., specified) size to be managed, and the divided lump of the predetermined size may be interpreted as a page. The page size may correspond to the page stored in the database file 251. The number of times of update may refer, for example, to the number of times of applying the frame stored in the WAL file in the database file. The applying of the frame stored in the WAL file in the database file may be referred to as an update or checkpoint. Whenever the frame stored in the WAL file is applied in the database file, the number of times of update may be increased (e.g., +1). The frame error check may refer, for example, to a random value (e.g., salt value) generated when the WAL file is initialized. If the value included in the frame error check is equal to the value included in the header error check included in the WAL frame, the WAL frame may be recognized as a normal frame. The WAL header error check may include a value (e.g., checksum) for determining whether there is an error in the WAL header. The information included in the WAL header is illustrated by way of non-limiting example to aid in understanding of the disclosure, and the disclosure is not limited thereto.

The WAL frame may include changes (e.g., correction, deletion, or addition) of the application data stored in the database file 251. The WAL frame may include a WAL frame header and a page. The frame of the WAL file is mapped onto the page stored in the database file 251, and the mapping page number may be recorded in the WAL frame header. For example, the WAL frame may include at least one of WAL frame header, page number, bCommit, header error check, WAL frame error check, or database page. The page number may refer, for example, to the page number including the changes. The bCommit may indicate the size of the database file 251 in case of the Commit frame, or may be configured to 0 in case of other frames. In the header error check, the same value as the value included in the frame error check included in the WAL header may be stored. The WAL frame error check may include the value (e.g., checksum) for determining whether there is an error in the WAL frame. The database page may include the page in which the changes are applied. The contents included in the WAL frame are examples to aid in understanding of the disclosure, and the disclosure is not limited thereto.

If a request to update the database file 251 stored in the memory 130 occurs, the processor 120 may add the frame (e.g., WAL frame) of the WAL file corresponding to the updated page of the database file 251. For example, if the update corresponding to one page of the database file 251 is requested, the processor 120 may add the frame including the number of the updated page to the WAL file. Further, if the update corresponding to two pages of the database file 251 is requested (e.g., first page and third page), the processor 120 may add the frames (first frame corresponding to the first page and second frame corresponding to the third page) including the number of two updated different pages to the WAL file.

At operation 305, the processor 120 may allocate the reserved space to the WAL file. The reserved space may refer, for example, to securing of a free space in the WAL file. In order to add the frame to the WAL file, a new storage space may be necessary. If the memory 130 has insufficient storage space, a new frame is unable to be added to the WAL file, and thus the update of the database file may fail. In order to prevent or reduce the update failure of the database file 251, the disclosure may allocate the reserved space to the WAL file in case that the new frame is added to the WAL file. The processor 120 may determine the size of the allocated reserved space based on the setting (e.g., default setting value) by a user or the electronic device 101. According to various embodiments, the processor 120 may allocate the reserved space even in a state where the frame is not added to the WAL file.

According to various embodiments, the processor 120 may provide a user interface for configuring the size of the reserved space of the WAL file. The user may set the size of the reserved space of the WAL file through the user interface. The processor 120 may determine the minimum size of the reserved space to be allocated. For example, the minimum size of the reserved space may be configured based on the size of one page (e.g., 1 MB) of the database file 251. The processor 120 may allocate the reserved spaces as many as the configured number (e.g., 2 or 3) for one frame corresponding to the size of one page.

According to various embodiments, the processor 120 may generate the WAL file, and may allocate the reserved space of the predetermined (e.g., specified) size in case that the frame is initially added. If the frame is not initially added, for example, if the second frame is added, the processor 120 may determine whether to allocate the reserved space based on the storage space of the memory 130. If the size of the storage space (e.g., storable space) of the memory 130 is less than the predetermined size, the processor 120 may not allocate the reserved space to the WAL file. If the size of the storage space of the memory 130 is equal to or greater than the predetermined size, the processor 120 may allocate the reserved space to the WAL file. For example, if the size of the free space that can be stored in the memory 130 is less than the predetermined size, the reserved space may not be allocated to the WAL file, whereas if the size of the free space that can be stored in the memory 130 is equal to or greater than the predetermined size, the reserved space may be allocated to the WAL file. Allocation of the reserved space is for smooth update of the database file 251, and if the storage space of the memory 130 is insufficient, the storage space of the memory 130 may not be used as much as the reserved space. If the storage space of the memory 130 is insufficient, the processor 120 may not allocate the reserved space.

According to various embodiments, the processor 120 may determine the minimum size of the reserved space to be additionally secured for the WAL file. For example, the minimum size of the reserved space may be configured based on the size of one page of the database file 251. The size of one page of the database file 251 may correspond to the size of one frame of the WAL file.

At operation 307, the processor 120 may update the database file 251 based on the update condition. The update of the database file 251 may apply the frame stored in the WAL file in the database file 251. The update condition may be a condition that the size of the WAL file corresponds to the predetermined size, or may be a condition that the number of frames included in the WAL file corresponds to the predetermined number. Since the size of one frame is limited, it may be understood that the size of the WAL file corresponds to the predetermined size in case that the number of frames corresponds to the predetermined number.

According to various embodiments, the processor 120 may apply the latest frame of the WAL file in the database file 251. The first to fifth pages may be included in the database file 251, and among them, the second page may be twice corrected, and the fourth page may be once corrected. The processor 120 may apply the most later corrected one of the twice corrected second page in the database file 251. For example, as the first update, the first frame corresponding to the second page may be added to the WAL file, and as the second update, the second frame corresponding to the fourth page and the third frame corresponding to the second page may be added to the WAL file. The processor 120 may apply the second frame and the third frame in the database file 251. When updating the database file 251, the processor 120 may apply the third frame between the first frame and the third frame corresponding to the second page in the database file 251.

According to various embodiments, the processor 120 may invalidate the WAL file by applying the frame stored in the WAL file in the database file 251. The WAL file invalidation may be deletion of the WAL file (e.g., there is not the appended file, or the size of the appended file is 0), an invalid WAL file header, or nonexistence of a valid frame. The header of the WAL file (e.g., WAL header) may include basic information about the WAL file, and for example, may include at least one of an identification number, a file format version, a page size, the number of times of update, a frame error check, or a WAL header error check. The invalid WAL file header may refer, for example, to any one of the values included in the header of the WAL file (e.g., any one of the identification number, the file format version, the page size, the number of times of update, the frame error check, or the WAL header error check) not being valid. Frames corresponding to the pages of the database file 251 may be added to the WAL file, and if the WAL file is invalidated, the frames included in the WAL file may be deleted in all, and no frame may be included in the WAL file.

At operation 309, the processor 120 may allocate the reserved space to the database file 251. When the database file 251 is updated, the originally existing page may be corrected, a new page may be added, or the originally existing page may be deleted. For example, in case that a new page is added, the size of the storage space of the database file 251 may be increased as much as the addition of the new page. In order to prevent or reduce the update of the database file 251 from failing due to the lack of storage space of the database file 251, the processor 120 may allocate the reserved space to the database file 251 after updating the database file 251. Further, the processor 120 may allocate the reserved space to the database file 251 regardless of whether to update the database file 251. Although it is explained in the drawing that operation 309 is performed after operation 307, the operation 309 may also be performed before the operation 301. This is merely an implementation issue, and the disclosure is not limited thereto.

According to various embodiments, the processor 120 may determine the size of the reserved space allocated to the database file 251 based on the configuration by a user or the electronic device 101 (e.g., default configuration). The processor 120 may provide a user interface for configuring the size of the reserved space of the database file 251. The user may configure the size of the reserved space of the database file 251 through the user interface. The processor 120 may determine the minimum size of the reserved space to be allocated.

According to various embodiments, the processor 120 may also allocate the reserved space to the database file or the WAL file in the memory 130 regardless of the update (or update request). When generating the database file or the WAL file (e.g., before the update), the processor 120 may allocate the reserved space to the database file, and may allocate the reserved space to the WAL file.

Figure 4:
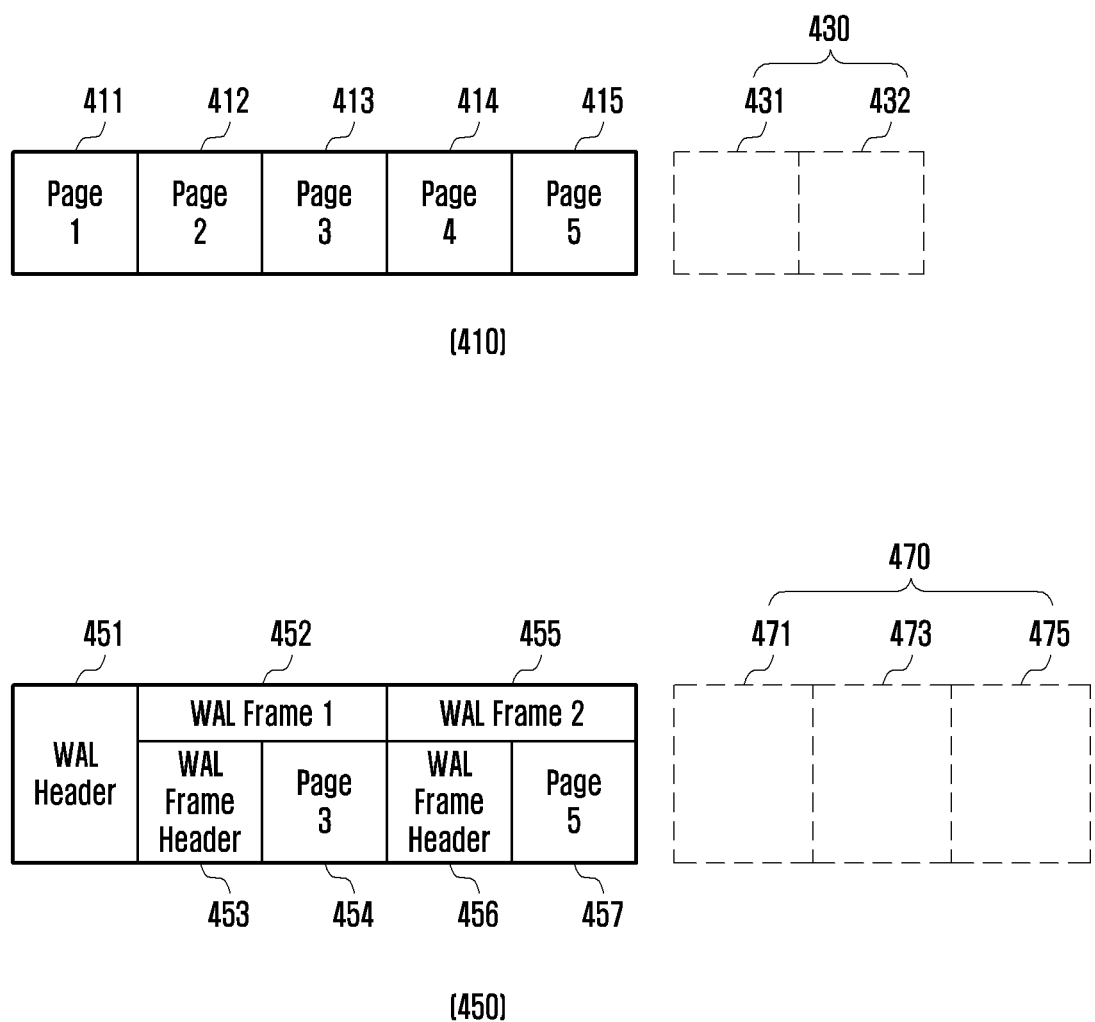
FIG. 4 is a diagram illustrating an example of a database file and a WAL file according to various embodiments.

FIG. 4 is a diagram illustrating an example of a database file and a WAL file according to various embodiments.

Referring to FIG. 4, a database file 410 (e.g., database file 251 of FIG. 2) according to various embodiments may include a first page 411, a second page 412, a third page 413, a fourth page 414, a fifth page 415, and a reserved space 430. The reserved space 430 may have the size corresponding to two pages 431 and 432. The minimum size corresponding to one page 431 may be configured.

If an update of application data is requested, a processor (e.g., processor 120 of FIG. 1) of an electronic device (e.g., electronic device 101 of FIG. 1) according to various embodiments may generate a WAL file 450 (e.g., appended file 253 of FIG. 2). The WAL file 450 may be one of appended files 253 of FIG. 2. In FIG. 4, a case that the appended file is the WAL file will be explained by way of non-limiting example, but the disclosure is not limited to such explanation. For example, if it is requested to update the third page 413 and the fifth page 415 of the database file 410, a first frame 452 corresponding to the third page 413 and a second frame 455 corresponding to the fifth page 415 may be added to the WAL file 450. The WAL file 450 may include a WAL header 451 and at least one WAL frame (e.g., 452 and 455). The WAL header 451 may include basic information about the WAL file. The WAL frame (e.g., 452 and 455) may include changes (e.g., correction, deletion, and addition) of the application data stored in the database file 410. The first frame 452 may include a header (WAL frame header) 453 of the first frame 452 and a page 454 corresponding to the third page 413 of the database file 410. The second frame 455 may include a WAL frame header 456 and a page 457 corresponding to the fifth page 415 of the database file 410.

The processor 120 may allocate a reserved space 470 to the WAL file 450. The reserved space 470 may refer, for example, to securing of a free space in the WAL file 450. If a new frame is added to the WAL file 450, the reserved space may be allocated to the WAL file 450. According to various embodiments, the processor 120 may generate the WAL file 450, and if the frame (e.g., first frame 452 and second frame 455) is initially added, the processor 120 may allocate the reserved space 470. The processor 120 may determine the size of the reserved space 470 to be allocated based on the user or the configuration (e.g., default configuration value) of the electronic device 101. For example, the processor 120 may determine the size of the reserved space 470 to be allocated based on the size of one page of the database file 410. The processor 120 may determine the size of the reserved space 470 as large as three frames 471, 473, and 475. The example of FIG. 4 is to help understanding of the disclosure only, and the number of frames being allocated as the reserved space 470 may be changeable. According to various embodiments, the processor 120 may allocate the reserved space 470 even in a state where the frame is not added to the WAL file 450.

The processor 120 may allocate the reserved space 430 even to the database file 410. The processor 120 may allocate the reserved space 430 to the database file 410 before or after updating the database file 410. According to various embodiments, the processor 120 may determine the size of the reserved space 450 to be allocated based on the user or the configuration (e.g., default configuration value) of the electronic device 101. For example, the processor 120 may determine the size of the reserved space 450 as large as two pages 431 and 432. The example of FIG. 4 is to aid in understanding of the disclosure only, and the number of pages being allocated as the reserved space 430 may be changeable.

Figure 5:
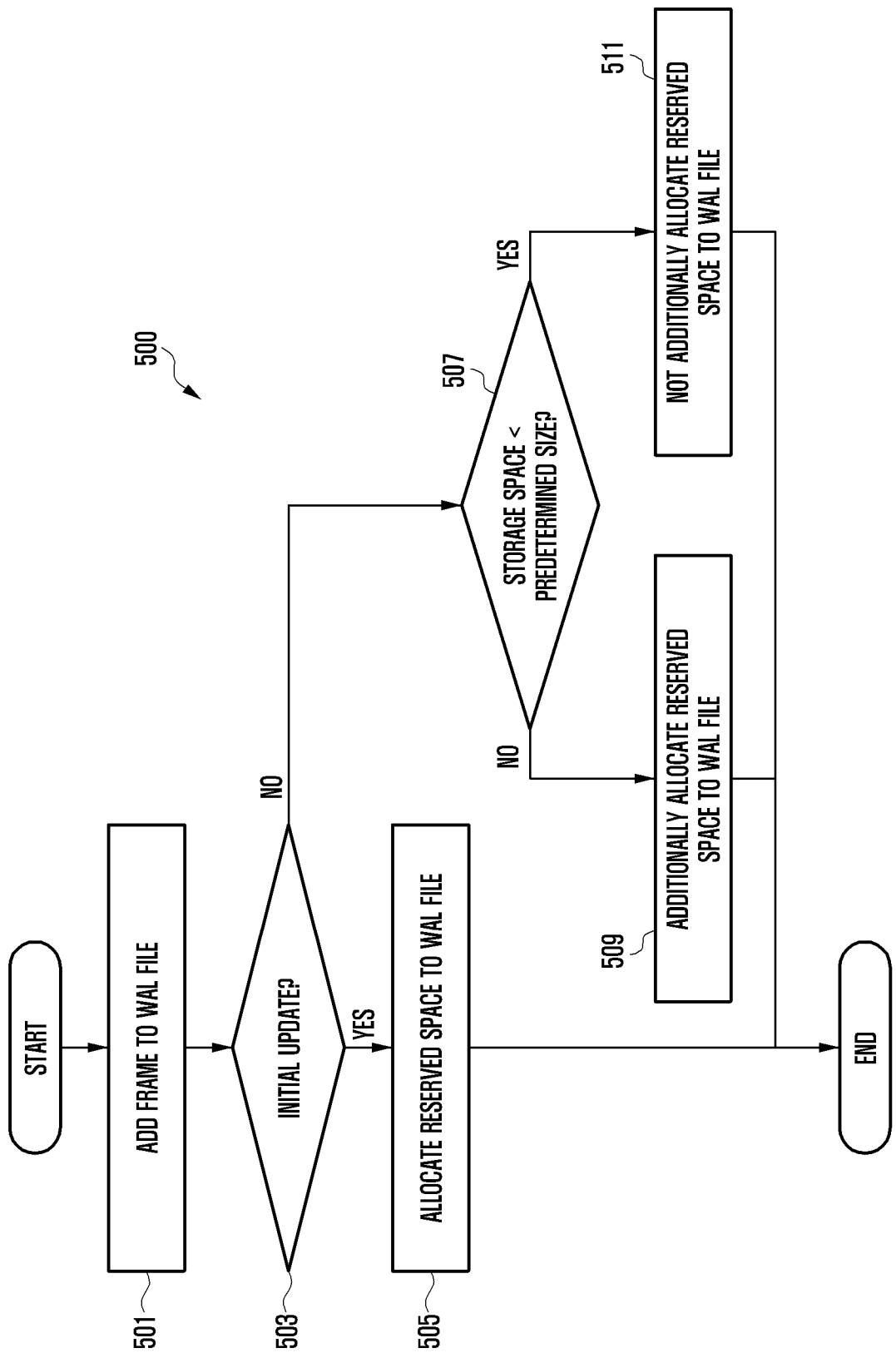
FIG. 5 is a flowchart illustrating an example method for allocating a reserved space based on a storage space of an electronic device according to various embodiments.

FIG. 5 is a flowchart 500 illustrating an example method for allocating a reserved space based on a storage space of an electronic device according to various embodiments. FIG. 5 may, for example, and without limitation, embody operation 303 and operation 305 of FIG. 3.

Referring to FIG. 5, at operation 501, the processor (e.g., processor 120 of FIG. 1) of the electronic device (e.g., electronic device 101 of FIG. 1) according to various embodiments may add the frame (or update frame) to the WAL file (e.g., appended file 253 of FIG. 2 or WAL file 450 of FIG. 4) based on the update request. The update request may refer, for example, to an operation of correcting, deleting, or adding the application data (or application). The update request may be generated by the user or in accordance with the configuration of the electronic device 101. The processor 120 may add the frame corresponding to the updated page among the pages included in the database file (e.g., database file 410 of FIG. 4) to the WAL file 450.

At operation 503, the processor 120 may determine whether the addition of the frame to the WAL file 450 corresponds to the initial update. If the update condition is satisfied, the processor 120 may apply the frame included in the WAL file 450 in the database file 410, and may delete the WAL file 450. Thereafter, if the update is requested, the WAL file 450 is generated, and it may be understood that the initial addition of the frame after the WAL file 450 is generated is the "initial update". In case of the initial update, the processor 120 may perform operation 505, whereas if not, the processor 120 may perform operation 507.

In case of the initial update, at operation 505, the processor 120 may allocate the reserved space (e.g., reserved space 470 of FIG. 4) to the WAL file 450. The reserved space 470 may refer, for example, to securing of the free space in the WAL file 450. In order to add the frame to the WAL file 450, a new storage space is necessary, and by first securing the reserved space 470 in the WAL file 450, the update failure of the database file 410 can be prevented or reduced.

If not the initial update, at operation 507, the processor 120 may determine whether the size of the storage space of the memory (e.g., memory 130 of FIG. 1) is less than the predetermined size. If not the initial update and if the size of the storage space of the memory 130 is equal to or greater than the predetermined size, the processor 120 may allocate the reserved space 470 to the WAL file 450. The storage space of the memory 130 may refer, for example, to the free space being storable in the memory 130. If the size of the storage space of the memory 130 is equal to or greater than the predetermined size, the processor 120 may perform operation 509, and if the size of the storage space of the memory 130 is less than the predetermined size, the processor 120 may perform operation 511.

At operation 509, the processor 120 may additionally allocate the reserved space 470 to the WAL file 450. According to various embodiments, the processor 120 may determine the minimum size of the reserved space to be additionally secured in the WAL file 450. For example, the minimum size of the reserved space may be configured based on the size of one page of the database file 410. The size of one page of the database file 410 may correspond to the size of one frame of the WAL file 450. The processor 120 may additionally allocate the reserved space 470 based on the size of the frame added to the WAL file 450. For example, in case that the reserved space 470 has a size enough to store three frames, and one frame is added by the update request, the processor 120 may additionally allocate the reserved space 470 as much as the space corresponding to one frame. The processor 120 may additionally allocate the reserved space 470 to the WAL file as much as the added frame. Through the additional allocation of the reserved space 470, the initially allocated space as the reserved space 470 may be maintained as it is.

At operation 511, the processor 120 may not additionally allocate the reserved space 470 to the WAL file 450. Allocation of the reserved space 470 is for smooth update of the database file 410, and if the storage space of the memory 130 is insufficient, the storage space of the memory 130 may not be used as much as the reserved space 470. If the storage space of the memory 130 is insufficient, the processor 120 may not additionally allocate the reserved space 470. For example, in case that the reserved space 470 has the size enough to store three frames, and one frame is added through the update request, the reserved space 470 may remain as much as the size enough to store two frames.

The above-described example is to aid understanding of the disclosure only, and the disclosure is not limited by the description.

Figure 6:
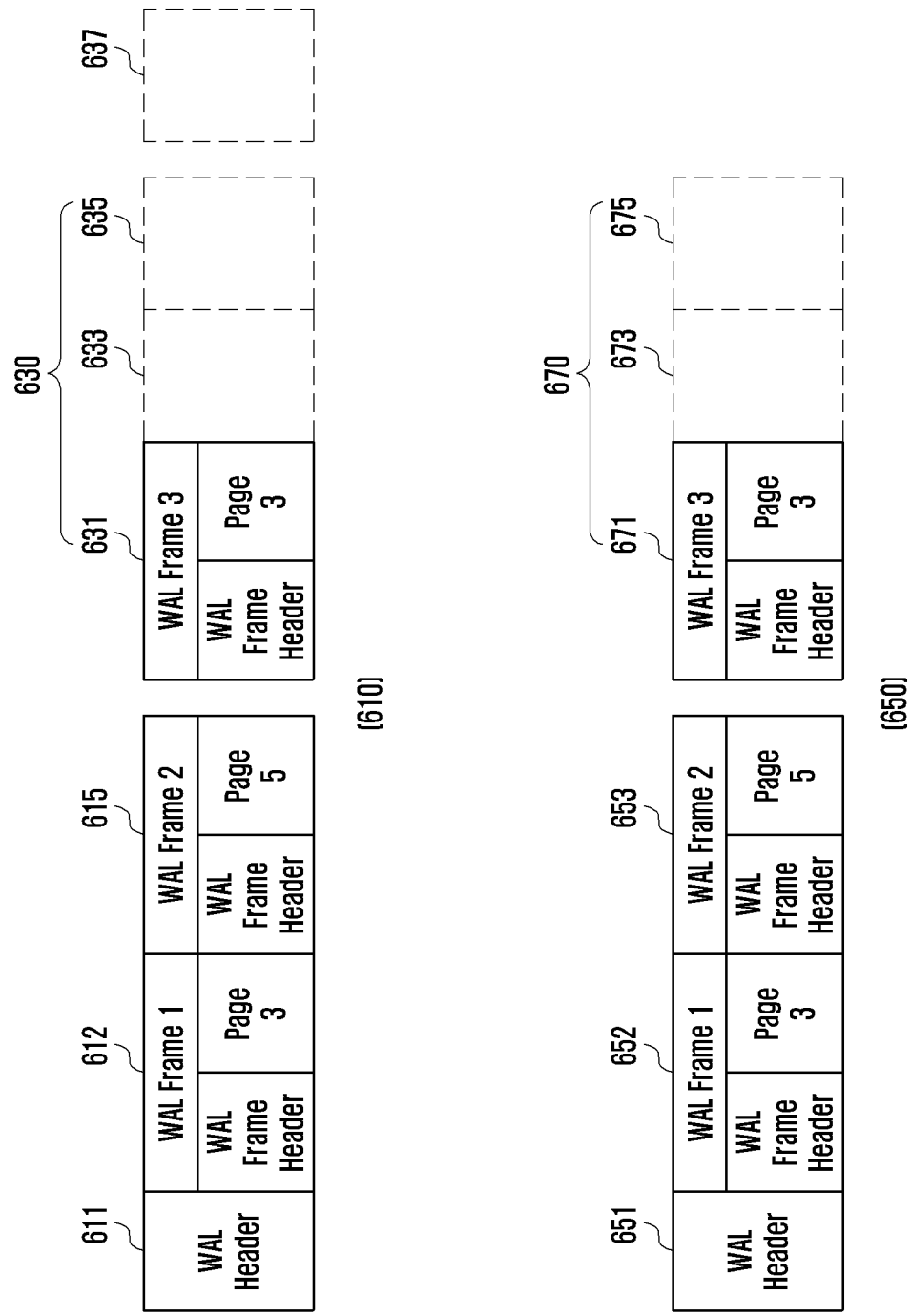
FIG. 6 is a diagram illustrating an example of allocating a reserved space to a WAL file according to various embodiments.

FIG. 6 is a diagram illustrating an example of allocating a reserved space to a WAL file according to various embodiments.

Referring to FIG. 6, through the first update request, a first frame 612 (e.g., first frame 452 of FIG. 4) and a second frame 615 (e.g., second frame 455 of FIG. 4) may be added to a WAL file 610 (e.g., appended file 253 of FIG. 2 or WAL file 450 of FIG. 4) according to various embodiments, and through the second update request, a third frame 631 may be added. For example, the WAL file 610 may include a WAL header 611 (e.g., WAL header 451 of FIG. 4) and at least one WAL frame (e.g., 612, 615, and 631). The first frame 612 may include a header (WAL frame header) of the first frame 612 and a database file (e.g., page (page 3) corresponding to the third page (e.g., third page 413 of FIG. 4) of the database file 410 of FIG. 4). The second frame 615 may include a WAL frame header and a page (page 5) corresponding to the fifth page (e.g., fifth page 415 of FIG. 4) of the database file 410. The third frame 631 may include a WAL frame header and a page (page 3) corresponding to the third page 413 of the database file 410.

If the third frame 631 is added to the WAL file 610 by the second update request, the processor (processor 120 of FIG. 1) may control additional allocation of the reserved space 630 based on the storage space of the memory (e.g., memory 130 of FIG. 1). For example, if the size of the storage space of the memory 130 is equal to or greater than a predetermined size, the processor 120 may additionally allocate a free space 637 to the reserved space 630. For example, the reserved space 630 may be configured to have at least three free spaces 631, 633, and 635. If one free space is used in the reserved space 630 due to the addition of the third frame 631, the reserved space 630 may have two free spaces 633 and 635. If the free space of the memory 130 is sufficient, the processor 120 may additionally secure the free space 637 in the reserved space 630.

According to various embodiments, through the first update request, a first frame 652 (e.g., first frame 452 of FIG. 4) and a second frame 653 (e.g., second frame 455 of FIG. 4) may be added to a WAL file 650 (e.g., appended file 253 of FIG. 2), and through the second update request, a third frame 671 may be added. In case that the third frame 671 is added to the WAL file 650 through the second update request, the processor (e.g., processor 120 of FIG. 1) may control the additional allocation of the reserved space 670 based on the storage space of the memory 130. For example, if the size of the storage space of the memory 130 is less than the predetermined size, the processor 120 may not additionally allocate the free space to the reserved space 670. For example, the reserved space 670 may be configured to have at least three free spaces 671, 673, and 675. If one free space is used in the reserved space 670 due to the addition of the third frame 671, the reserved space 670 may have two free spaces 673 and 675. If the free space of the memory 130 is insufficient, the processor 120 may not additionally secure the free space in the reserved space 670.

Figure 7:
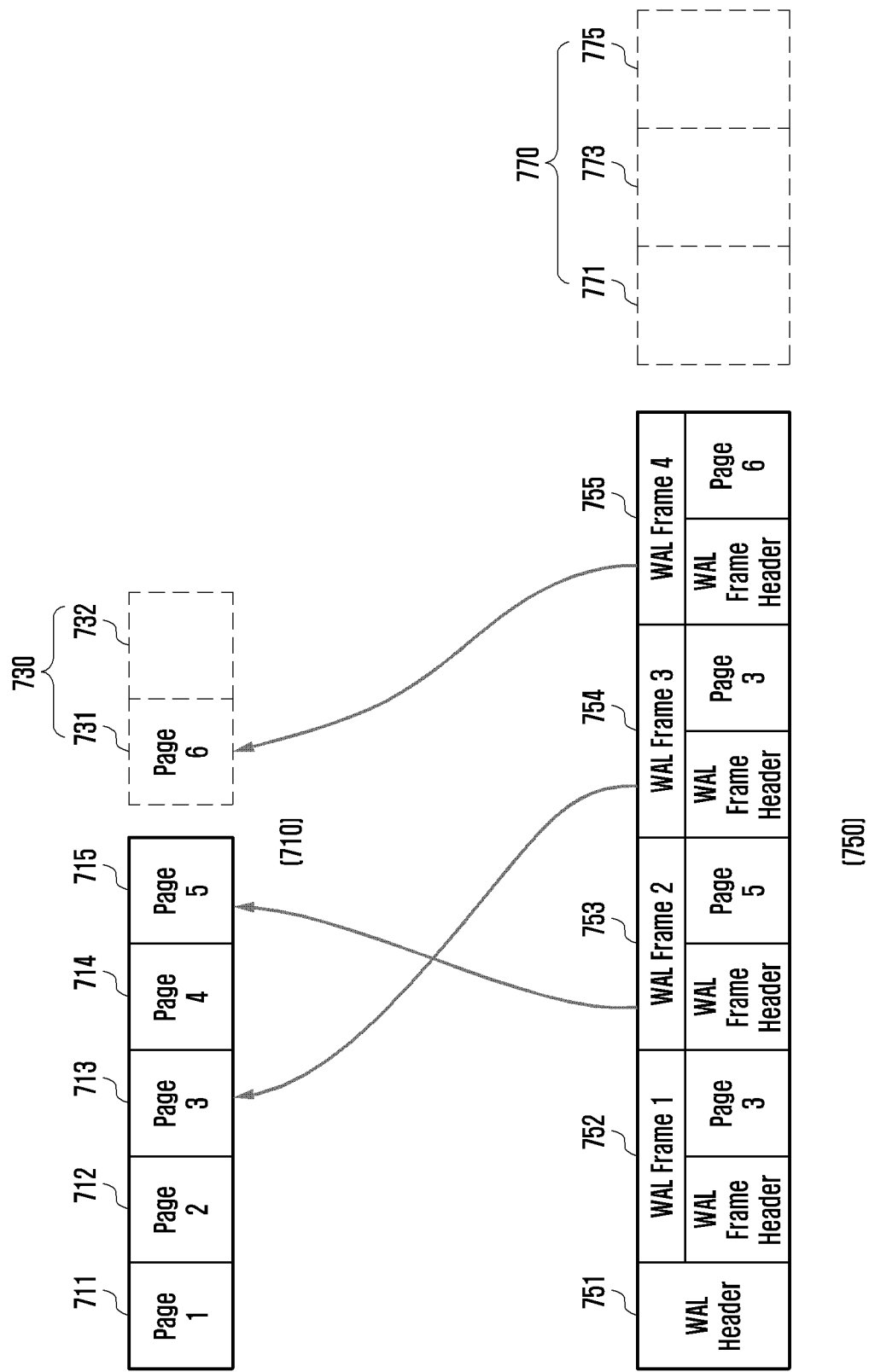
FIG. 7 is a diagram illustrating an example of applying a frame of a WAL file in a database file according to various embodiments.

FIG. 7 is a diagram illustrating an example of applying a frame of a WAL file in a database file according to various embodiments.

With reference to FIG. 7, a database file 710 (e.g., database file 251 of FIG. 2 or database file 410 of FIG. 4) according to various embodiments may include a first page 711 (e.g., first page 411 of FIG. 4), a second page 712 (e.g., second page 412 of FIG. 4), a third page 713 (e.g., third page 413 of FIG. 4), a fourth page 714 (e.g., fourth page 414 of FIG. 4), a fifth page 715 (e.g., fifth page 415 of FIG. 4), and a reserved space 730. The reserved space 730 may be allocated based on the size of one page of the database file 710. For example, the reserved space 730 may be allocated corresponding to the size of two pages 731 and 732.

If an update (e.g., correction, deletion, or addition) of application data is requested, the processor (e.g., processor 120 of FIG. 1) of the electronic device (e.g., electronic device 101 of FIG. 1) according to various embodiments may add a frame to a WAL file (e.g., appended file 253 of FIG. 2 or WAL file 450 of FIG. 4). For example, the WAL file 750 may include a WAL header 751 and at least one WAL frame (e.g., 752, 753, 754, and 755). For example, through the first update request, a first frame 752 (e.g., first frame 452 of FIG. 4) and a second frame 753 (e.g., second frame 455 of FIG. 4) may be added to a WAL file 750, and through the second update request, a third frame 754 may be added, and through the third update request, a fourth frame 755 may be added. The WAL file 750 may include a reserved space 770. The reserved space 770 may refer, for example, to securing of free spaces 711, 773, and 775 for adding a new frame to the WAL file 750.

If an update condition is satisfied, the processor 120 may apply the frames 752, 753, 754, and 755 stored in the WAL file 750 in the database file 710. The update condition may be a condition that the size of the WAL file 750 corresponds to a predetermined size, or may be a condition that the number of frames included in the WAL file 750 corresponds to a predetermined number. For example, the processor 120 may apply the latest frame of the WAL file 750 in the database file 710. The processor 120 may apply the third frame 754 in the third page 713 of the database file 710, apply the second frame 753 in the fifth page 715 of the database file 710, and add a sixth page 731 to the database file 710 based on the fourth frame 755. The sixth page 731 may be added to the reserved space 730 of the database file 710. According to the disclosure, since the reserved space 730 for adding the page to the database file 710 is secured in advance, the update failure of the database file 710 can be prevented or reduced.

Figure 8:
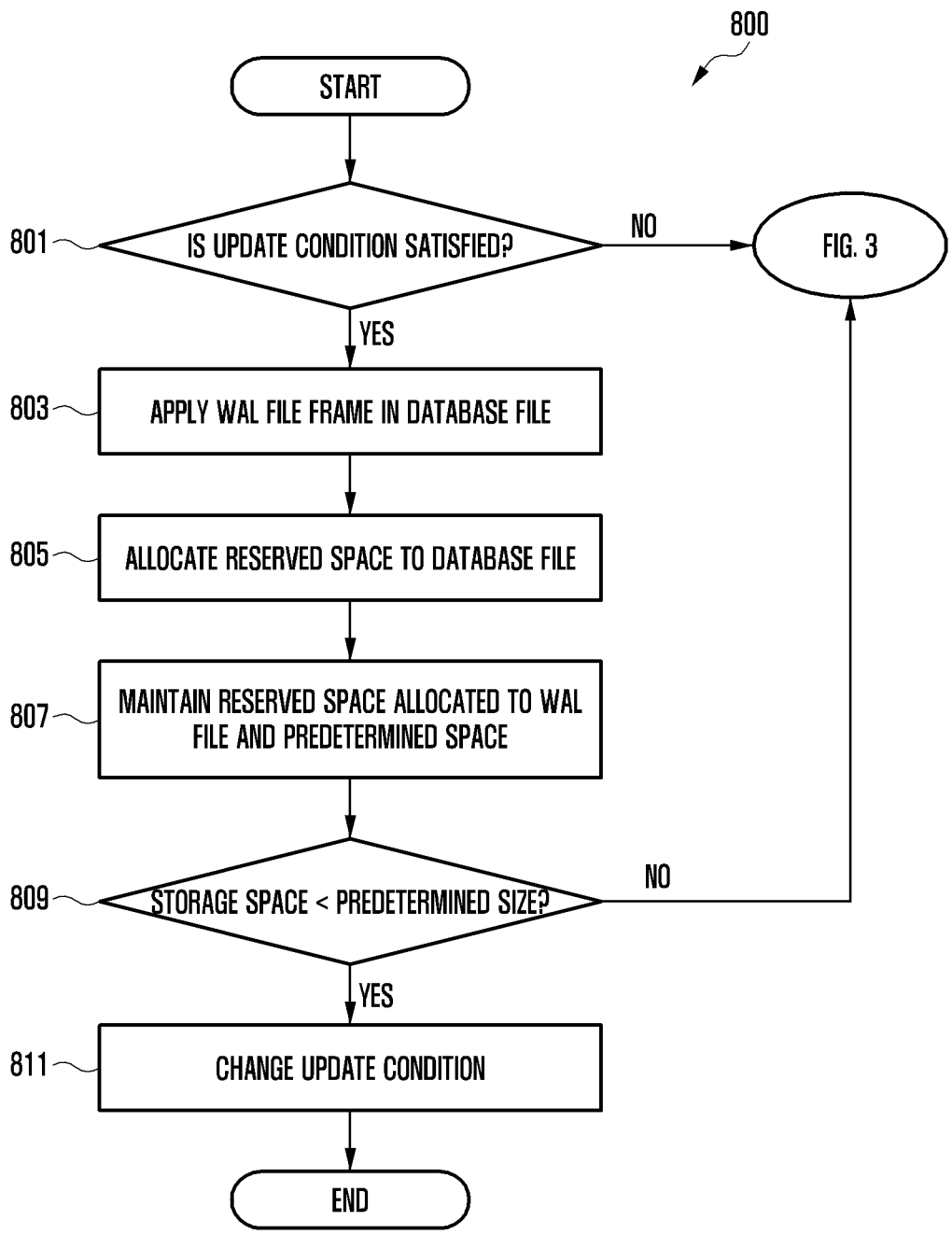
FIG. 8 is a flowchart illustrating an example method for changing an update condition based on a storage space of an electronic device according to various embodiments.

FIG. 8 is a flowchart illustrating an example method for changing an update condition based on a storage space of an electronic device according to various embodiments. FIG. 8 may, for example, and without limitation, embody operation 307 and operation 309 of FIG. 3.

Referring to FIG. 8, at operation 801, the processor (e.g., processor 120 of FIG. 1) of the electronic device (e.g., electronic device 101 of FIG. 1) according to various embodiments may determine whether the update condition is satisfied. The update condition may be a condition that the size of the WAL file (e.g., appended file 253 of FIG. 2 or WAL file 450 of FIG. 4) corresponds to the predetermined size, or may be a condition that the number of frames included in the WAL file 450 corresponds to the predetermined number. Since the size of one frame is limited, it may be interpreted that the size of the WAL file 450 corresponds to the predetermined size in case that the number of frames corresponds to the predetermined number. If the update condition is satisfied, the processor 120 may perform operation 803, and if the update condition is not met, the processor 120 may perform the operation of FIG. 3. For example, if the update condition is not met, the processor 120 may detect whether an update request is generated. If the update request is generated (e.g., operation 301 of FIG. 3), the processor 120 may perform operation 303.

If the update condition is satisfied, the processor 120, at operation 803, may apply the frame of the WAL file 450 in the database file (e.g., database file 251 of FIG. 2). For example, referring to FIG. 7, if the update condition is satisfied, the processor 120 may apply the frames 752, 753, 754, and 755 stored in the WAL file (e.g., WAL file 750 of FIG. 7) in the database file 710. The processor 120 may apply the latest frame of the WAL file 750 in the database file 710. The processor 120 may apply the third frame 754 in the third page 713 of the database file 710, apply the second frame 753 in the fifth page 715 of the database file 710, and add the sixth page 731 to the database file 710 based on the fourth frame 755.

At operation 805, the processor 120 may allocate the reserved space (e.g., reserved space 730 of FIG. 7) to the database file 710. When the database file 710 is updated, the originally existing page may be corrected, a new page may be added, or the originally existing page may be deleted. For example, in case that a new page is added, the size of the storage space of the database file 710 may be increased as much as the addition of the new page. In order to prevent and/or reduce the update of the database file 710 from failing due to the lack of storage space of the database file 710, the processor 120 may allocate the reserved space 730 to the database file 710 after updating the database file 710. Further, the processor 120 may allocate the reserved space 730 to the database file 710 regardless of whether to update the database file 710.

At operation 807, the processor 120 may maintain the reserved space (reserved space 770 of FIG. 7) allocated to the WAL file 750 and a predetermined space. The processor 120 may maintain the space configured in the WAL file 750 and the reserved space after applying the frame stored in the WAL file 750 in the database file 710. The configured space may refer, for example, to the minimum used space of the WAL file 750. If the application data is updated, the WAL file 750 should be reused, and thus the free space as much as the minimum used space may be maintained in the WAL file 750 in addition to the reserved space. The minimum used space may be determined by the user or according to the configuration of the electronic device 101.

For example, the processor 120 may invalidate the WAL file 750 by applying the frame stored in the WAL file 750 in the database file 710. The invalidation of the WAL file 750 may be deletion of the WAL file 750 (e.g., there is not the appended file, or the size of the appended file is 0), an invalid header of the WAL file 750, or nonexistence of a valid frame. The header of the WAL file 750 (e.g., WAL header) may include basic information about the WAL file 750, and for example, may include at least one of an identification number, a file format version, a page size, the number of times of update, a frame error check, or a WAL header error check. The invalid header of the WAL file 750 may refer, for example, to any one of the values included in the header of the WAL file 750 (e.g., any one of the identification number, the file format version, the page size, the number of times of update, the frame error check, or the WAL header error check) not being valid. Frames corresponding to the pages of the database file 710 may be added to the WAL file 750, and if the WAL file 750 is invalidated, the frames included in the WAL file 750 may be deleted in all, and no frame may be included in the WAL file 750.

At operation 809, the processor 120 may determine whether the size of the storage space of the memory (e.g., memory 130 of FIG. 1) is less than the predetermined size. The processor 120 may control the update condition based on the storage space of the memory 130 after updating the database file 710. If the size of the storage space of the memory 130 is less than the predetermined size, the processor 120 may perform operation 811, whereas if the size of the storage space of the memory 130 is equal to or greater than the predetermined size, the processor 120 may perform the operation of FIG. 3. For example, if the size of the storage space of the memory 130 is equal to or greater than the predetermined size, the processor 120 may maintain the update condition. The processor 120 may detect whether the update request is generated, and if the update request is generated (e.g., operation 301 of FIG. 3), the processor 120 may perform the operation 303.

If the size of the storage space of the memory 130 is less than the predetermined size, the processor 120, at operation 811, may change the update condition. The update condition may be a condition that the size of the WAL file 750 corresponds to the predetermine size, or may be a condition that the number of frames included in the WAL file 750 corresponds to the predetermined number. If the size of the storage space of the memory 130 is less than the predetermined size, the processor 120 may make the database file 710 be updated more frequently by changing the update condition. For example, if the database file 710 is updated in a state where the number of frames included in the WAL file 750 is 100, and if the size of the storage space of the memory 130 is less than the predetermined size in a state where the number of frames included in the WAL file 750 is 50, the processor 120 may change the update condition so that the database file 710 is updated.

Figure 9A:
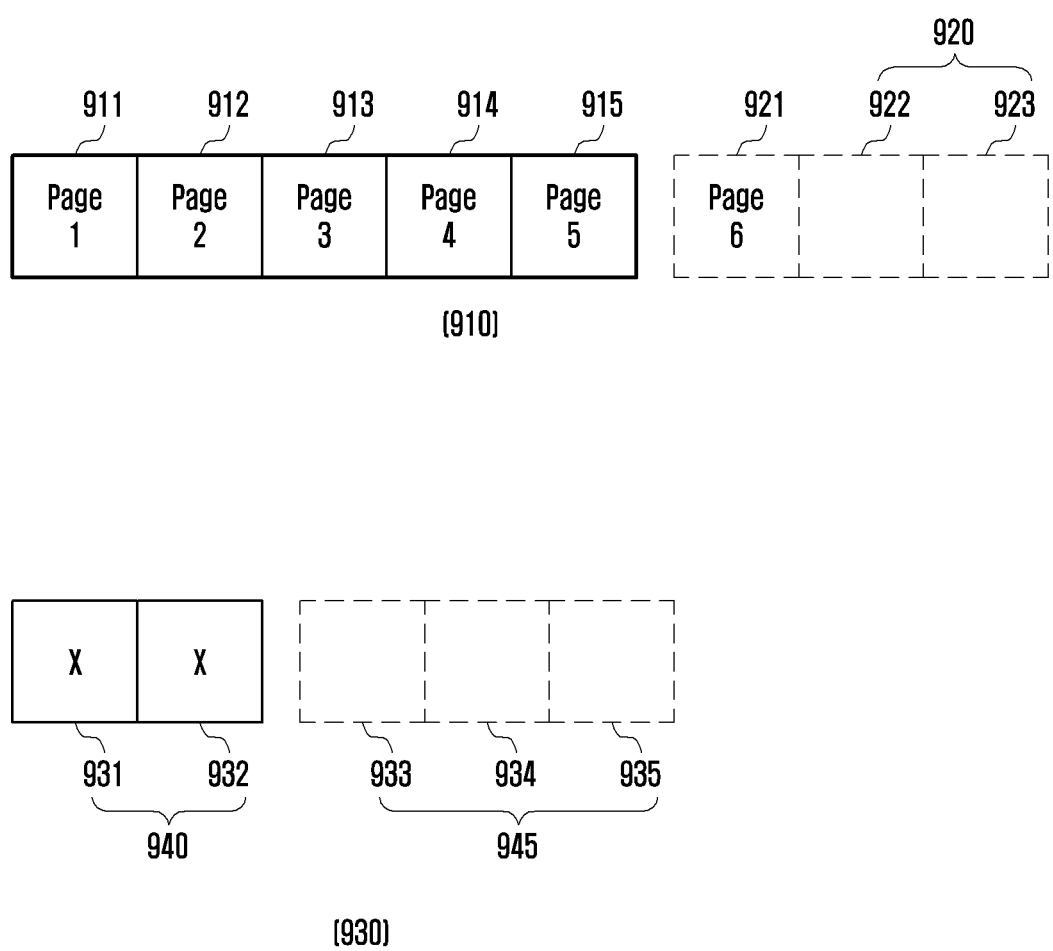
FIGS. 9A and 9B are diagrams illustrating examples of maintaining reserved spaces of a database file and a WAL file according to various embodiments.
Figure 9B:
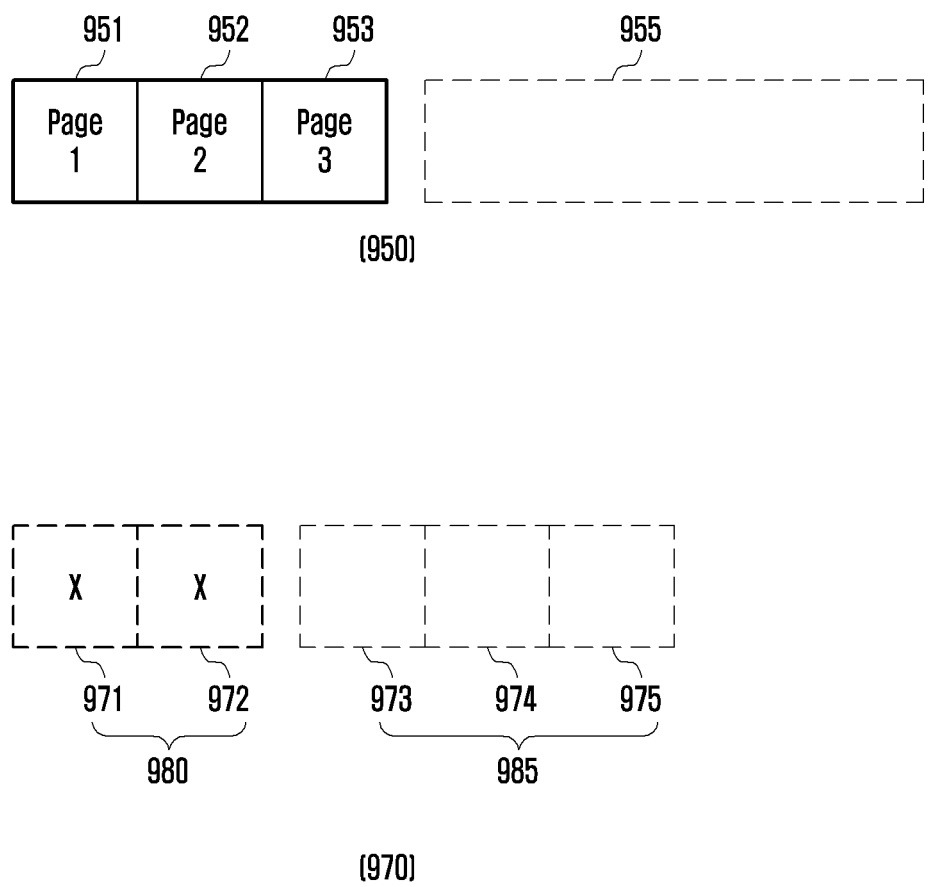

FIGS. 9A and 9B are diagrams illustrating examples of maintaining reserved spaces of a database file and a WAL file according to various embodiments.

Referring to FIG. 9A, if the update condition is satisfied, the processor (e.g., processor 120 of FIG. 1) of the electronic device (e.g., electronic device 101 of FIG. 1) according to various embodiments may update a database file 910 (e.g., database file 251 of FIG. 2 or database file 410 of FIG. 4), and may invalidate a WAL file 930 (e.g., appended file 253 or WAL file of FIG. 4). The database file 910 may include a first page 911 (e.g., first page 411 of FIG. 4), a second page 912 (e.g., second page 412 of FIG. 4), a third page 913 (e.g., third page 413 of FIG. 4), a fourth page 914 (e.g., fourth page 414 of FIG. 4), a fifth page 915 (e.g., fifth page 415 of FIG. 4), and a reserved space 920. The reserved space 920 may be allocated based on the size of one page of the database file 910. For example, the reserved space 920 may be allocated corresponding to the size of three pages 921, 922, and 923.

Through the update, one page 921 of the reserved space 920 of the database file 910 may be used. The processor 120 may maintain a configured space 940 and a reserved space 945 in the WAL file 930 after invalidating the WAL file 930. If the application data is updated, the WAL file 930 should be reused, and thus the free space as much as the minimum used space may be maintained in the WAL file 930 in addition to the reserved space. The minimum used space may be determined by the user or according to the configuration of the electronic device 101. For example, the configured space 940 may have a size as large as the size corresponding to two frames 931 and 932, and the reserved space 945 may have a size as large as the size corresponding to three frames 933, 934, and 935. The example as in the drawing is to help understanding of the disclosure only, and the disclosure is not limited to such explanation.

Referring to FIG. 9B, if the update condition is satisfied, the processor 120 may update the database file 950, and may invalidate the WAL file 970. Through the update, the database file 950 may include the first page 951, the second page 952, the third page 953, and the reserved space 955. Due to the update, some pages (e.g., fourth page 914 and fifth page 915) may be deleted. Due to the deleted page, the reserved space 955 may be increased. For example, the reserved space 955 may be increased as much as the size of the deleted pages. According to various embodiments, since some pages may be deleted due to the update of the database file 950, the processor 120 may change the update condition so that the database file 950 is updated more frequently in case that the storage space of the memory (e.g., memory 130 of FIG. 1) is insufficient.

After invalidating the WAL file 970, the processor 120 may maintain the space 980 configured in the WAL file 970 and the reserved space 985. For example, the configured space 980 may have the size corresponding to the two frames 971 and 972, and the reserved space 985 may have the size corresponding to the three frames 973, 974, and 975. If the storage space of the memory 130 is insufficient, the processor 120 may maintain the configured space 980 of the WAL file 970 and the reserved space 985. Further, if the storage space of the memory 130 is insufficient, the processor 120 may reduce the size of the reserved space 985 of the WAL file 970.

Figure 10:
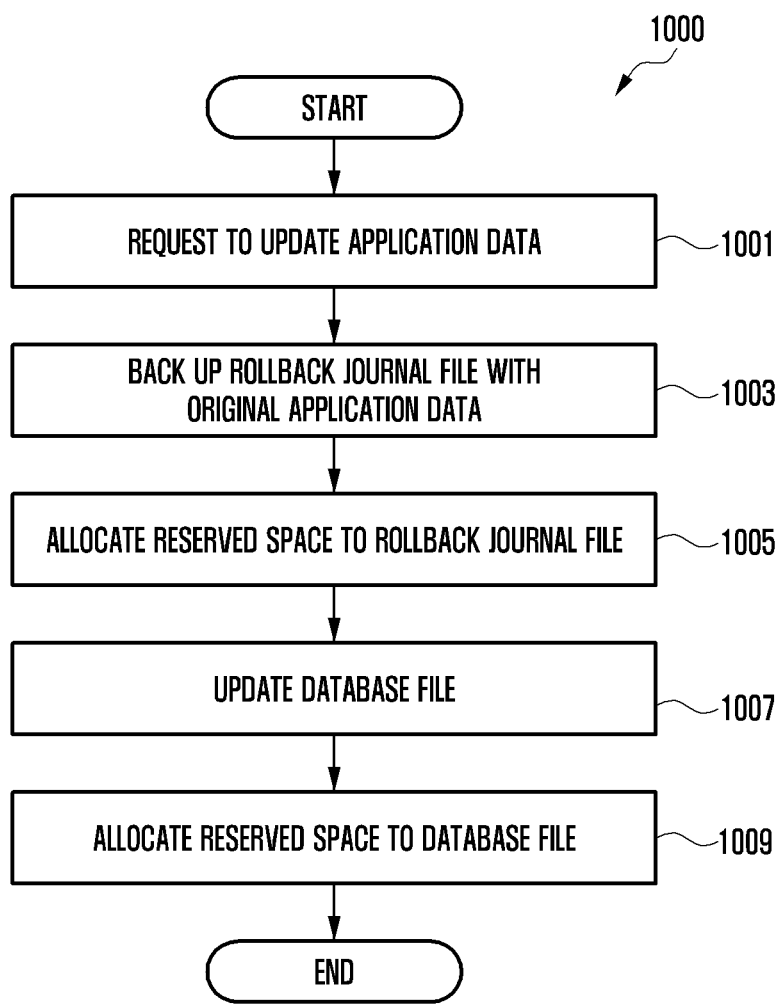
FIG. 10 is a flowchart illustrating an example method for operating an electronic device according to various embodiments.

FIG. 10 is a flowchart illustrating an example method for operating an electronic device according to various embodiments. The method of FIG. 10 may include an operation in case that an appended file is a rollback journal file.

Referring to FIG. 10, the processor (e.g., processor 120 of FIG. 1) of the electronic device (e.g., electronic device 101 of FIG. 1) according to various embodiments may receive a request to update application data (or application) in operation 1001. The update request may refer, for example, to an operation of correcting, deleting, or adding the application data. The update request may be generated by a user, or may be generated in accordance with the configuration of the electronic device 101.

At operation 1003, the processor 120 may perform a backup of the original application data in a rollback journal file (or appended file) based on the update request. The journal technique may be a technique to generate and utilize a rollback journal file (e.g., appended file 253 of FIG. 2) in addition to a database file (e.g., database file 251 of FIG. 2) for storing the application data. If the appended file is a rollback journal file, the processor 120 may perform the backup of the application data stored in the database file 251 in the rollback journal file before updating the database file 251. According to various embodiments, the processor 120 may allocate the reserved space even in a state where the original application data is not backed up in the rollback journal file.

At operation 1005, the processor 120 may allocate the reserved space in the rollback journal file. The reserved space may refer, for example, to securing of the free space in the rollback journal file. The processor 120 may determine the size of the reserved space to be allocated based on the user or the configuration (e.g., default configuration value) of the electronic device 101. Since operation 1005 is the same as or is similar to the operation 305 of FIG. 3, the detailed explanation thereof may not be repeated here.

At operation 1007, the processor 120 may update the database file 251. The update of the database file 251 may refer, for example, to applying of the changed items in the database file 251 in accordance with the update request. If the appended file is the rollback journal file, the processor 120 may update the database file 251 whenever the update is requested.

At operation 1009, the processor 120 may allocate the reserved space to the database file 251. When the database file 251 is updated, the originally existing page may be corrected, a new page may be added, or the originally existing page may be deleted. For example, in case that a new page is added, the size of the storage space of the database file 251 may be increased as much as the addition of the new page. In order to prevent and/or reduce the update of the database file 251 from failing due to the lack of storage space of the database file 251, the processor 120 may allocate the reserved space to the database file 251 after updating the database file 251. Further, the processor 120 may allocate the reserved space to the database file 251 regardless of whether to update the database file 251. Since operation 1009 is the same as or is similar to the operation 309 of FIG. 3, the detailed explanation thereof may not be repeated here. Although it is explained in the drawing that operation 1009 is performed after operation 1007, the operation 1009 may also be performed before the operation 1001. This is merely an implementation issue, and the disclosure is not limited thereto.

According to various embodiments, the processor 120 may also allocate the reserved space to the database file or the rollback journal file in the memory 130 regardless of the update (or update request). When generating the database file or the rollback journal file (e.g., before the update), the processor 120 may allocate the reserved space to the database file, and may allocate the reserved space to the rollback journal file.

A method for operating an electronic device according to various example embodiments may include: receiving a request to update application data stored in a memory of the electronic device; adding a frame to an appended file based on the update request; allocating a reserved space to the appended file; updating a database file based on an update condition; and allocating the reserved space to the database file.

According to an example embodiment, the adding may include adding changes of the application data stored in the database file to the frame in accordance with the update request.

According to an example embodiment, the allocating of the reserved space to the appended file may include: determining whether the frame is initially added to the appended file, and allocating the reserved space based on whether the frame is initially added.

According to an example embodiment, the allocating of the reserved space to the appended file may include: allocating the reserved space to the appended file based on the frame being initially added to the appended file, and determining whether to allocate the reserved space based on a storage space of the memory based on the frame not being initially added to the appended file.

According to an example embodiment, the allocating of the reserved space to the appended file may include: allocating the reserved space to the appended file based on the storage space of the memory having a size equal to or greater than a specified size, and not allocating the reserved space to the appended file based on the storage space of the memory being less than the specified size.

According to an example embodiment, the updating may include applying the frame stored in the appended file in the database file based on the update condition being satisfied.

According to an example embodiment, the method may further include displaying a user interface for configuring a size of the reserved space through the display.

According to an example embodiment, the method may further include maintaining the reserved space allocated to the appended file and a specified space after the database file is updated.

According to an example embodiment, method may further include controlling the update condition based on a storage space of the memory based on the database file being updated.

According to an example embodiment, the controlling may include: maintaining the update condition based on the storage space of the memory having a size equal to or greater than a specified size, and changing the update condition based on the storage space of the memory having a size less than the specified size.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
   a display;
   a memory comprising a database file, the database file comprising a plurality of pages corresponding to application data and reserved space; and
   a processor operatively connected to the display and/or the memory,
   wherein the processor is configured to:
   add a frame corresponding to an updated page of the application data stored in the database file to an appended file, based on a request to update the application data,
   determine whether the frame is initially added to the appended file,
   allocate, when the frame is initially added to the appended file, the reserved space to the appended file,
   determine, when the frame is not initially added to the appended file, whether to allocate the reserved space to the appended file based on a storage space of the memory,
   update the database file to apply the frame stored in the appended file based on identifying that an update condition is satisfied, and
   after updating the database file, allocate the reserved space to the database file,
   wherein the update condition comprises a condition that a size of the appended file corresponds to a predetermined size, or a condition that the number of frames included in the appended file corresponds to a predetermined number.

2. The electronic device of claim 1, wherein the processor is configured to:
   allocate the reserved space to the appended file based on the storage space of the memory having a size equal to or greater than a specified size, and
   not allocate the reserved space to the appended file based on the storage space of the memory being less than the specified size.

3. The electronic device of claim 1, wherein the processor is configured to display a user interface for configuring a size of the reserved space through the display.

4. The electronic device of claim 1, wherein the processor is configured to maintain the reserved space allocated to the appended file and a specified space based on the database file being updated.

5. The electronic device of claim 1, wherein the processor is configured to control the update condition based on a storage space of the memory based on the database file being updated.

6. The electronic device of claim 5, wherein the processor is configured to:
   maintain the update condition based on the storage space of the memory having a space equal to or greater than a specified space, and
   change the update condition based on the storage space of the memory having a space less than the specified space.

7. A method for operating an electronic device including a processor and a memory comprising a database file, the database file comprising a plurality of pages corresponding to application data and reserved space, the method comprising:
   receiving a request to update application data stored in the memory of the electronic device;
   adding a frame corresponding to an updated page of the application data stored in the database file to an appended file, based on the update request;
   determining whether the frame is initially added to the appended file;
   allocating, when the frame is initially added to the appended file, the reserved space to the appended file;
   determining, when the frame is not initially added to the appended file, whether to allocate the reserved space to the appended file based on a storage space of the memory;
   updating the database file to apply the frame stored in the appended file based on identifying that an update condition is satisfied; and
   after updating the database file, allocating the reserved space to the database file,
   wherein the update condition comprises a condition that a size of the appended file corresponds to a predetermined size, or a condition that the number of frames included in the appended file corresponds to a predetermined number.

8. The method of claim 7, wherein allocating a reserved space to the appended file comprises:
   allocating the reserved space to the appended file based on the storage space of the memory having a size equal to or greater than a specified size; and
   not allocating the reserved space to the appended file based on the storage space of the memory being less than the specified size.

9. The electronic device of claim 1, wherein the appended file is a write ahead log.

* * * * *